Patented Dec. 26, 1922.

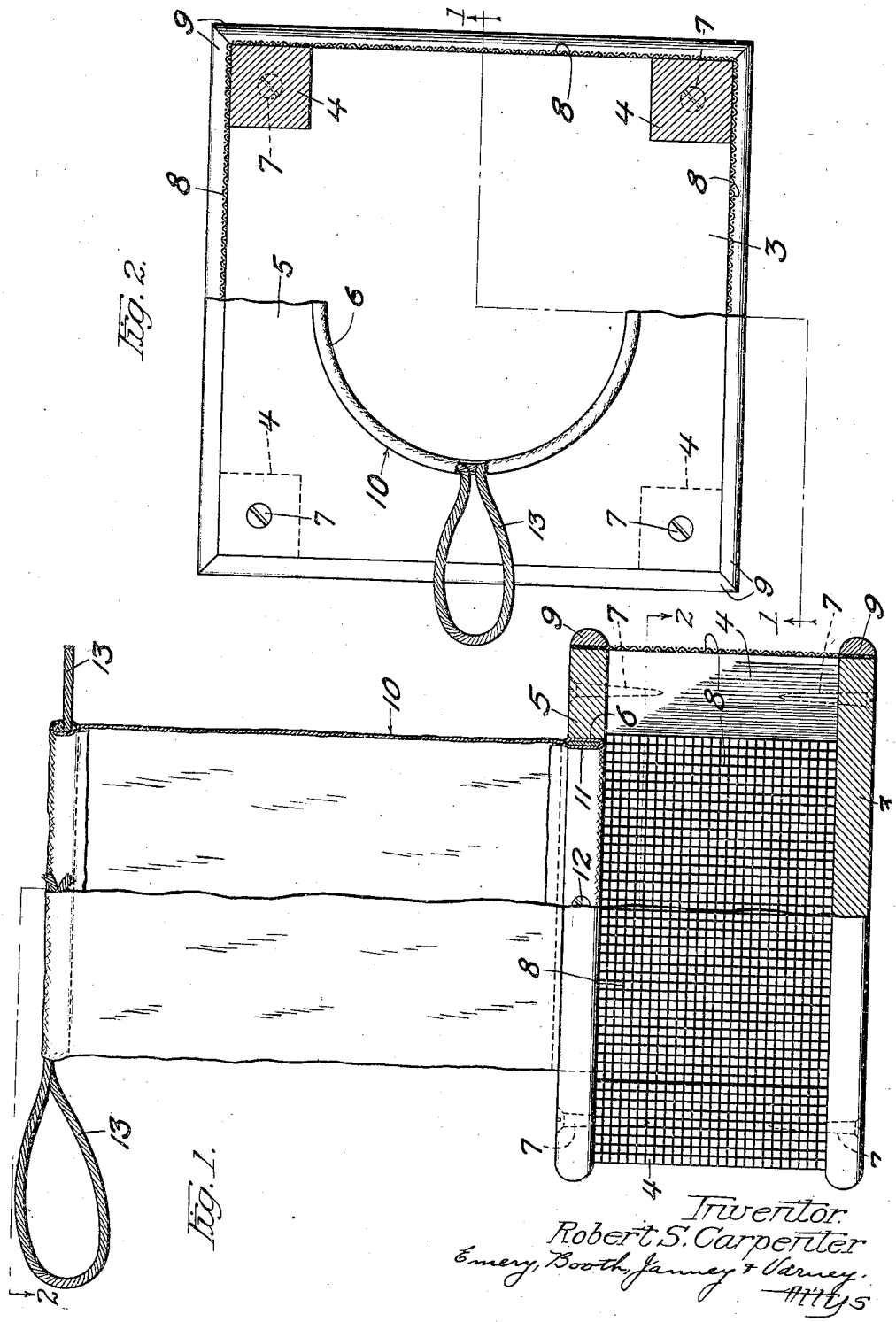

1,439,690

UNITED STATES PATENT OFFICE.

ROBERT S. CARPENTER, OF CHICAGO, ILLINOIS.

LIVE-BAIT BOX.

Application filed August 6, 1920. Serial No. 401,692.

*To all whom it may concern:*

Be it known that I, ROBERT S. CARPENTER, a citizen of the United States, and a resident of the city of Chicago, county of Cook, and State of Illinois, have invented an Improvement in Live-Bait Boxes, of which the following is a specification.

This invention relates to bait boxes or receptacles and particularly to that class wherein it is desired to retain the bait alive and active until ready for use.

Among other objects the invention is intended to provide a construction contributing to simplicity, practicability, and efficiency; and wherein the difficulties experienced in the use of present articles of like character are overcome.

One illustrative construction containing an embodiment of the invention is shown, for example, in the accompanying drawings in which Fig. 1 is a side elevation, partly in section, of one form in which the invention may be employed and shown as indicated by the line 1—1 of Fig. 2.

Fig. 2 is a top plan view, partly in section, and shown as indicated by the line 2—2 of Fig. 1.

Referring to the drawings, a base or bottom member 3 is shown, in the present instance, of rectangular form and having secured at its corners the up-rights 4, to the upper ends of which is secured a top member 5 having an aperture 6 therethrough of such dimensions as to permit of the entrance of one's hand for the purpose of removing bait from the receptacle.

The members 3 and 5 may be secured to the uprights 4 in any desired manner as, for example, by the screws 7 passing through the members and into the ends of the uprights.

The side walls of the receptacle may be formed of any material open to the circulation of air therethrough, for example as shown in the illustrative device, a strip of wire fabric 8 having a mesh sufficiently small to restrain the smallest bait for which the receptacle is intended to be used, may be placed around the frame formed by the top and bottom members and the uprights, and having its upper and lower edges secured to the margins of the said members, thus forming an inclosure for the retention of live bait in a manner to permit of an ample supply of air to the bait to keep it in an active and lively condition.

Over the edges of the fabric and secured to the members 3 and 5 may be placed the half-round strips 9 to protect the user from the raw edges of the fabric.

To reduce to a minimum the possibility of bait, such as grasshoppers, frogs, or the like, escaping past the hand of the user while other of the bait is being removed from the receptacle, the aperture 6 is provided with a closure 10 of flexible material, such as ducking or the like, capable of being collapsed to completely close the entrance to the receptacle, or drawn closely about the wrist of the user while removing bait therefrom, thus overcoming an undesirable occurrence attendant upon the use of present forms of live bait receptacles.

The closure 10 is of tubular form and may be provided at its lower end with a forming strip 11 of any desired shape, but preferable of a shape conforming substantially to the margin of the aperture 6. The strip may be infolded within the lower end of the closure as shown, and with said lower end placed within the aperture 6 and secured in position in any desired manner, for example by the screws 12, one of which is shown in Fig. 1.

At the upper end of the tubular closure, the outer edge of the wall portion is folded upon itself to form a loop or tunnel through which, as in the illustrative device, drawstrings 13 may be threaded, or if desired an elastic tape may be used to collapse the closure and prevent the escape of bait from the receptacle.

It will be observed that in removing bait from the receptacle, the user after releasing the draw-string sufficiently to insert his hand at the mouth of the closure may draw the free end thereof closely about his wrist, and by reason of the flexibility of the closure may pass his hand through the aperture 6 and into the box portion to select his bait, the ability to see and select a particular piece of bait being possible by reason of the open mesh of the fabric comprising the side walls. After selecting the bait, by releasing the draw-string slightly the hand may be withdrawn and the mouth of the closure gathered to completely close the aperture, thus maintaining, at all times throughout the operation of removing a piece of bait therefrom, a substantially closed condition of the receptacle.

With the illustrative construction it is practically impossible, with the exercise of ordinary care on the part of the user, for any part of the bait contained in the receptacle to escape while other of said bait is being removed therefrom.

Obviously the present invention is not limited to any particular form of construction and the details of the illustrative construction may be variously modified without departing from the spirit and scope of my invention.

Having thus described my invention I claim:

1. A bait receptacle comprising, in combination, a main bait-containing box including a bottom member; a top member having a hand aperture; spacing means between said members; a fabric of relatively coarse mesh surrounding said members and spacing means and having its edges secured to the outer edges of said members to form side walls; means for protecting the edges of said fabric; a collapsible tubular closure having a forming strip infolded within its lower edge; means for securing said strip and said lower edge to the margin of said aperture; and means infolded within the upper edge of said closure for gathering said upper edge together.

2. A bait receptacle comprising, in combination, a bottom member; a top member having an aperture therethrough; means positioned near the edge of said members to hold the latter in spaced relation; wire fabric having its longitudinal edges secured to the outer edges of said members to form side walls; a flexible elongated tubular closure having a strip conforming to the margin of said aperture infolded within its lower edge; means for securing said strip and said lower edge to the margin of said aperture; and a draw-string at the upper end of said closure for gathering the upper edge thereof together.

In testimony whereof, I have signed my name to this specification.

ROBERT S. CARPENTER.